Jan. 20, 1925.  1,523,764
A. C. GILBERT
ELECTRIC MOTOR
Filed April 27, 1921   3 Sheets-Sheet 1
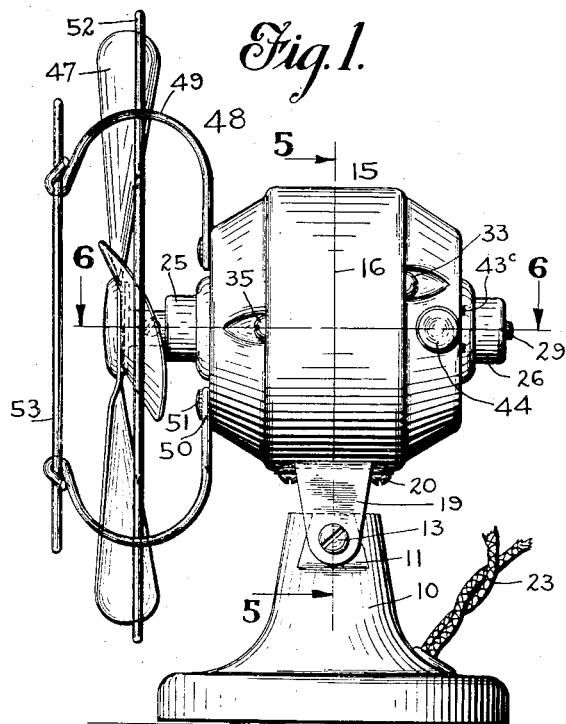
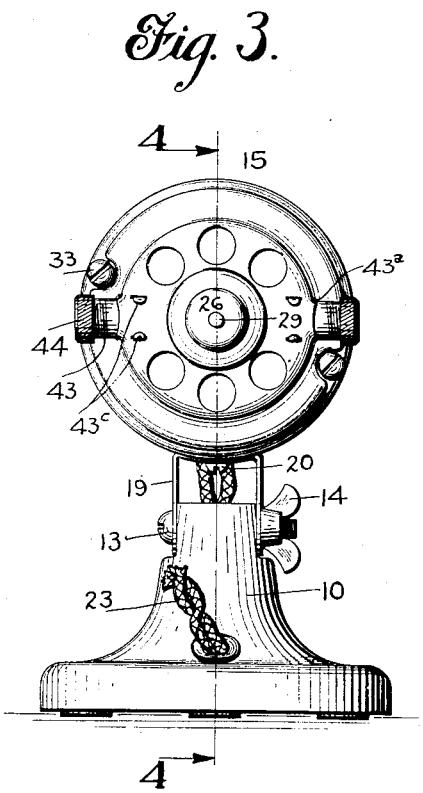
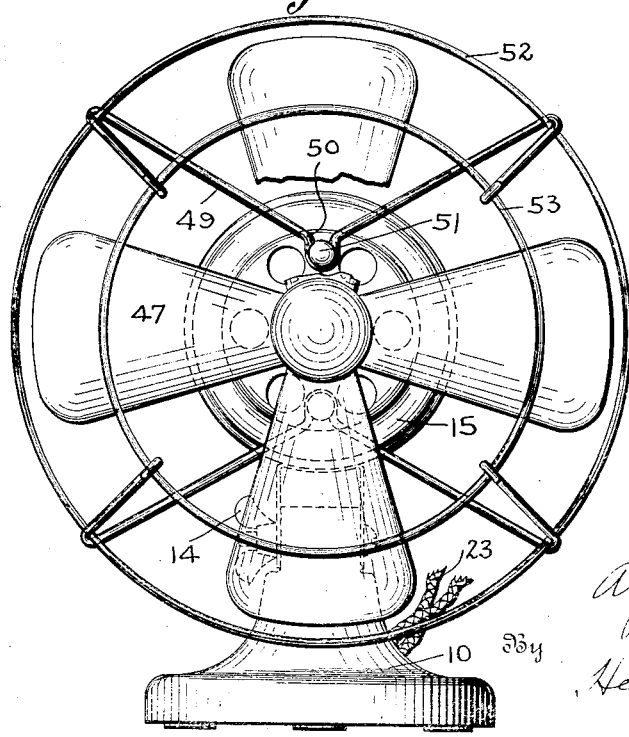
Inventor
Alfred C. Gilbert
By Henry E. Rockwell
Attorney Jan. 20, 1925.                                          1,523,764
                          A. C. GILBERT
                         ELECTRIC MOTOR
               Filed April 27, 1921        3 Sheets-Sheet 2
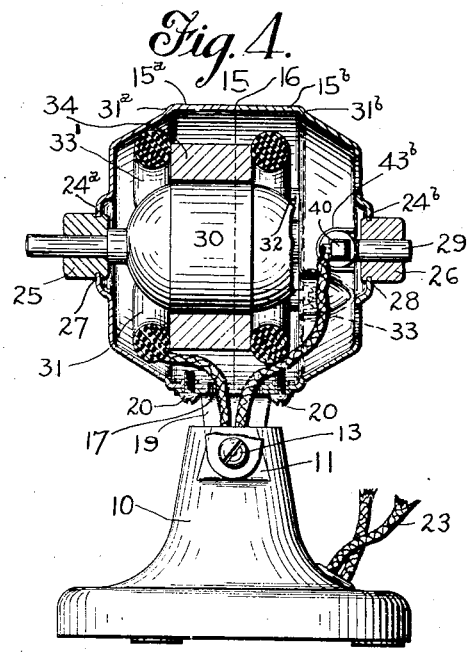
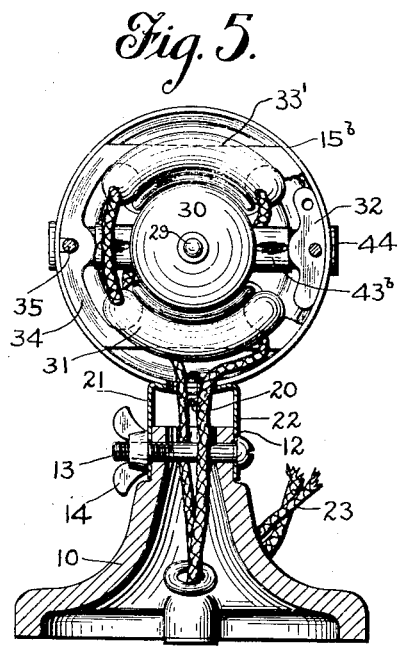
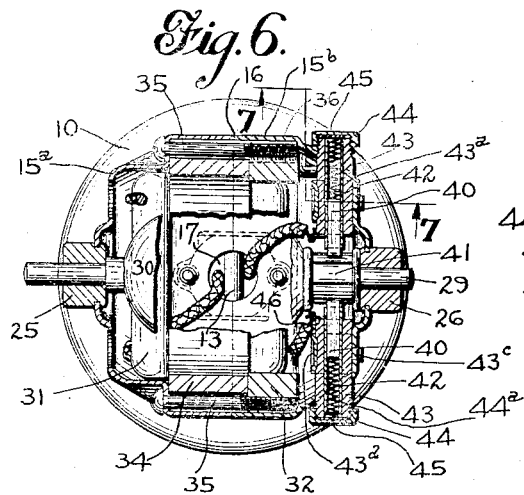
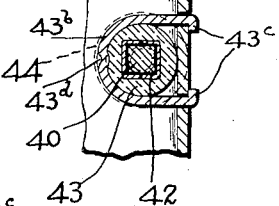
Inventor
Alfred C. Gilbert
By Henry E. Rockwell
Attorney Jan. 20, 1925.
A. C. GILBERT
ELECTRIC MOTOR
Filed April 27, 1921   3 Sheets-Sheet 3
1,523,764
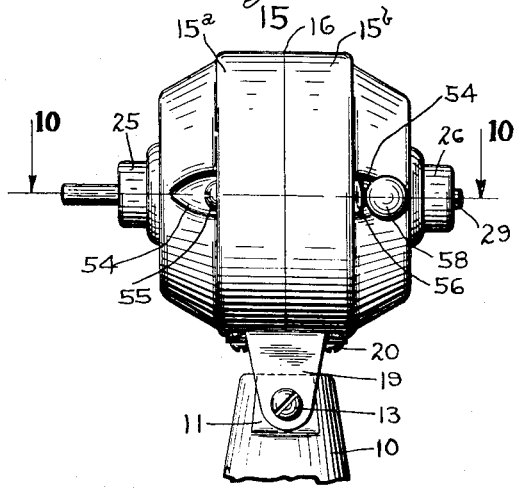
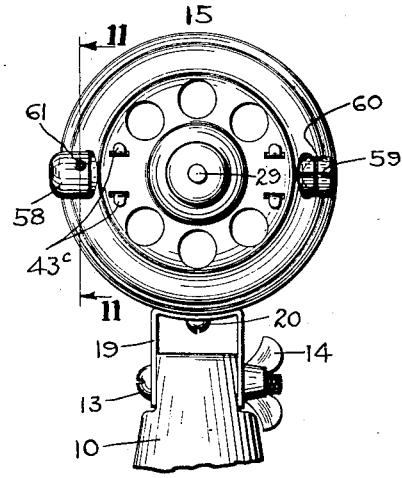
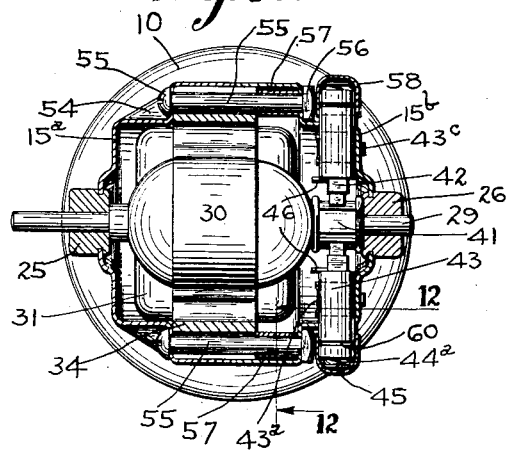
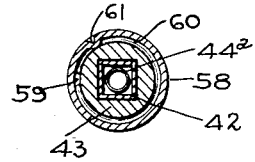
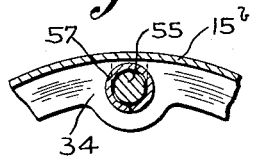
Inventor
Alfred C. Gilbert.
By Henry E. Rockwell
Attorney Patented Jan. 20, 1925.

1,523,764

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT.

ELECTRIC MOTOR.

Application filed April 27, 1921. Serial No. 464,796.

*To all whom it may concern:*

Be it known that I, ALFRED C. GILBERT, a citizen of the United States, residing in the city and county of New Haven, State of Connecticut, have invented certain new and useful Improvements in Electric Motors, of which the following is a full, clear, and exact description.

This invention relates to electric motors and more particularly to a motor of small size which may be used in connection with the driving of electric fans, beverage mixers and the like, which require only a moderate amount of power. The invention is concerned particularly with the construction of the motor casing and the mounting of the motor parts therein. I have preferred to show the principles of my invention as embodied in a motor for driving an electric fan and in this connection I have also shown a fan guard of novel construction.

One object of my invention is to provide a motor casing of improved construction, which may be manufactured cheaply and yet will be strong and serviceable and neat in appearance.

Another object of my invention is to provide a motor casing which may be drawn from sheet metal and which will be made up of two substantially identical sections secured together in a novel way.

Still further objects of my invention are to provide novel means for mounting the motor casing upon a suitable base; to provide improved means for positioning the various parts of the motor within the casing; to provide improved means for securing the commutator brushes therein; and to so generally improve the construction of the casing that the result will be a lessening of the cost of manufacture of the same without any sacrifice in the quality of the finished article.

I have, moreover, provided an improved fan guard for the fan shown in connection with my improved motor.

To these and other ends the invention consists in the novel features and combinations of parts to be hereinafter described and claimed.

In the accompanying drawings:

Fig. 1 is a side elevational view of an electric fan and motor embodying the principles of my invention;

Fig. 2 is a front view of the same with one of the fan blades broken away to show the construction of the parts behind the same;

Fig. 3 is a rear view of the motor, the fan and fan guard being removed;

Fig. 4 is a sectional view on line 4—4 of Fig. 3 with some parts broken away for the sake of clearness;

Fig. 5 is a sectional view on line 5—5 of Fig. 1;

Fig. 6 is a sectional view on line 6—6 of Fig. 1, the fan and fan guard, however, having been removed and the field magnet and armature being broken away to show the bottom of the casing;

Fig. 7 is a sectional view on line 7—7 of Fig. 6;

Fig. 8 is a side elevational view showing a somewhat modified form of a motor casing;

Fig. 9 is an end view of the same;

Fig. 10 is a sectional view on line 10—10 of Fig. 8;

Fig. 11 is a sectional view through one of the brush-holders on line 11—11 of Fig. 9; and Fig. 12 is a detail sectional view on line 12—12 of Fig. 10.

In illustrating the principles of my invention, I have shown a suitable base 10 provided with flattened portions 11 near its upper end and perforated at 12 to receive a bolt or pin 13 upon which the motor proper is pivotally mounted. The bolt is threaded at one end and adapted to receive a wing nut 14 by which the motor may be clamped in any desired adjusted position.

The motor casing 15 consists of two sections 15ᵃ and 15ᵇ substantially identical in shape which are made by being drawn from a suitable piece of sheet metal. These sections are provided with a closed and an open end and the two are assembled with the peripheral edges of the open ends in abutting relation and secured in a manner to be hereinafter described. The junction of the two sections is shown by the line 16 in Figs. 1 and 4. At the lower side each of these sections is provided with a recess in the form of a semi-circle, which openings, when the two halves are assembled, form the circular opening 17 shown more particularly in Fig. 6. A yoke member 19 is secured to the casing by suitable securing members, such as screws 20, and is provided with the legs 21 and 22 which are received upon the pin 13 to pivotally support the motor thereon, as previously described. The opening 17 serves to admit the conducting wires 23, which pass through the hollow portion of the base.

The closed ends of the two sections 15$^a$ and 15$^b$ are provided with central openings 24$^a$ and 24$^b$ in which are secured bearing bosses 25 and 26. These bearing bosses are provided with reduced portions upon their inner ends, which portions are received within the openings 24$^a$ and 24$^b$ and thereafter are spun over the edges of these openings until the metal of the two casing sections adjacent these openings is clamped against the shoulders 27 and 28 adjacent the reduced portions of the bosses. This provides an extended bearing surface for the armature shaft 29 carrying the armature 30, and these bosses are connected to the sheet metal casing in a satisfactory and efficient manner.

The drawing of the parts of the casing from sheet metal renders it difficult or impossible to provide in the casings the bosses or lugs which are usually found in the cast motor casings for the reception of screws or similar fastening members to secure the casing sections together. For this reason I have found it necessary to provide a novel method of securing the two sheet metal casing sections together and to position the motor parts therein. As clearly shown in Figs. 1 and 4 of the drawings, the casing sections are provided with shoulders 31$^a$ and 31$^b$, which lie between the cylindrical portion against the open ends of the same and the tapered portion adjacent the closed ends. Spacing blocks 32, one upon each side are placed against the shoulder 31$^b$, and securing members such as rivets or screws 33 are passed through the casing section 15$^b$ to secure the blocks tightly against the shoulder. If desired, of course, one block may be used circular in shape, which may extend about the whole circumference of this section of the casing, but it is preferred to use two spaced blocks, locating one at each side of the motor, as shown. The field magnet consisting of the field windings 33$^1$ and the field core 34 is positioned within the casing by lodging the field core member 34 against the shoulder 31$^a$ and clamping the same thereagainst by passing the long screws 35 through openings in the field core and into the blocks 32, which are provided with threaded openings 36 for the reception of the threaded ends of these screws. The thickness of the blocks 32 and the field core member 34 is so regulated that when the two casing sections are drawn into abutting relation by the screws 35, the field core member will be clamped between the shoulder 31$^a$ and the blocks 32, which will in turn be held tightly against the shoulder 31$^b$ by the screws 33. It will be obvious that while I have secured the two casing sections together by securing both of the same to the blocks 32, I have also made use of the securing members 35 to position the field core within the casing. These screws which pass through openings in the core will prevent the rotation of the same within the casing, while the blocks 32 and the shoulder 31$^a$ will prevent any longitudinal movement of the core therein.

I have shown the commutator brushes 40, which cooperate with the commutator 41, as mounted within sleeve linings 42 of tubular brush holders 43 formed of some non-conducting material. Spiral springs 44$^a$ are mounted in the brush holders behind the brushes 40 to resiliently urge these brushes toward the commutator and are retained therein by caps 44 which are threaded upon the brush holders. A small washer or disk 45 of some non-conducting material is placed between the spring and the cap so that there will be no danger of the operator receiving a shock from the caps 44, which are usually made of metal or the like. The brush holders 43 are inserted in openings 43$^a$ in the casing and are secured in position by clips 43$^b$ which are drawn tightly around the brush holding collars 43 and their ends are brought through small slits in the rear of the case and turned, as shown at 43$^c$ in Fig. 3 to clinch the clips in position and thus securely hold the collars against the rear wall of the casing. Small lugs 43$^d$ are struck up in the walls of the clips and are positioned in cooperating recesses in the collars to prevent any movement of the collars within the clips, shown more particularly in Fig. 6. The current is supplied to the brushes 40 by the wires 23 which are connected to small lugs 46 upon the sleeve linings 42. The current supplied by one of the wires 23 is passed through the field winding on its way to the brush 40.

A bladed fan 47 is shown in Figs. 1 and 2 mounted upon the armature shaft 29 and a fan guard 48 of novel construction is shown to prevent the blades of the fan from coming in contact with surrounding objects. This guard is constructed by providing a plurality of curved wires 49 which are looped at their intermediate portions 50 to receive securing members 51 between the wires forming the sides of the loop, so that they will be held secured to the motor casing by the broadened heads of the members 51. From the loops 50 the wires project outwardly to embrace a wire hoop 52 and then are turned inwardly and have their ends secured to a wire hoop 53 in front of the fan and of smaller diameter than the hoop 52. The wire hoop 52 is not secured to the wires 49, but is merely embraced by the loops which are formed by the bowed portions of the wires. This provides a very economical and satisfactory fan guard for an electric fan of this type.

In Figs. 8 to 12 of the drawings, I have shown a somewhat different embodiment of my invention. In this form the two casing members 15ª and 15ᵇ are brought together with the depressions 54 disposed in alignment instead of in staggered relation, as shown in Figs. 1 to 7 of the drawings. Screws or similar securing members 55 are passed through openings in the casing in these depressions and are preferably of sufficient length to pass through both sections of the casing and to be engaged upon their threaded ends by nuts or similar block members 56. To properly position the field core 34 within the casing, spacing members in the form of collars or the like 57 are provided to surround the bodies of the screws 55 and to take up the space between the field core and the wall of the casing 15ᵇ. If desired, the nuts 56 may be made integral with the collars 57 and the screw be threaded into the resulting part, but in any case, the nut will, of course, be larger than the opening in the casing adjacent thereto and will act in cooperation with the screw-head to draw the two parts of the casing together, the screw being associated with one part of the casing and the nut being associated with the other.

The caps 58 which are mounted upon the tubular brush-holders 43 are secured thereon in a novel fashion. The tubular brush-holder 43 which is preferably formed of fibre or some non-conducting material is provided with a longitudinal groove 59 and a peripheral groove 60, which communicate, as shown in Fig. 9. The cap is provided with a small boss 61 shown more particularly in Fig. 11, which, when the cap is to be placed upon the tubular brush-holder is brought into registration with the groove 59. The cap is then pushed upon the member 43 until this boss falls within the groove 60 when the cap is rotated to lock the same in position. It will be seen that this will provide a simple and effective means for locking the cap upon the brush-holder and when the latter is made of certain materials will be found more expedient than the usual threads.

While I have shown and described with particularity a preferred embodiment of my invention, it will be understood that the same will not be limited thereto in all of its details, but is capable of many modifications and variations which will fall within the spirit of the invention and within the scope of the appended claims.

What I claim is:

1. A sheet metal motor casing comprising two similarly formed sections, said sections substantially cup shaped, having the opposing peripheral edges of the open end of each in abutting relation, and means to connect said sections together comprising a spacing block adapted to clamp a field magnet member enclosed by said casing against one of said sections while spacing it from the other, and separate connecting means for securing said sections to said block.

2. A sheet metal motor casing comprising two similarly formed sections, said sections substantially cup shaped, having the opposing peripheral edges of the open end of each in abutting relation, means including a block having a surface thereof formed to fit the curvature of the interior of one of the sections adjacent the edge of the open end thereof and separate securing members for individually connecting each of said sections to said block to connect said sections together.

3. A sheet metal motor casing comprising two substantially similar cup shaped sections, the adjacent edges of which are adapted to abut each other, a spacing block within the casing and fastening members separately securing each of said sections to said block whereby the adjacent edges thereof are caused to tightly abut each other.

4. A sheet metal motor casing comprising two substantially similar cup shaped sections the adjacent edges of which are adapted to abut each other, a spacing block within the casing and fastening members securing each of said sections to said block, said block having a surface formed to fit the curvature of the interior of one of the sections adjacent the edge of the open end thereof.

5. A sheet metal motor casing comprising two substantially similar cup shaped sections at least one of which is provided with an interiorly formed shoulder, a spacing block within the casing one end of which rests against said shoulder, said block being secured to said shouldered section, and means to connect the other section to said block.

6. In an electric motor, the combination of a field magnet member with a sheet metal casing, comprising two similar cup shaped sections, each provided with an interior shoulder, said casing surrounding said field magnet member, and means including a spacing block for securing said sections together, said means positioning said magnet member within said casing and causing the same to be clamped against the shoulder in one of said sections by said spacing block and securing the other of said sections thereto.

7. In an electric motor, the combination of a field magnet member with a sheet metal casing comprising two similar cup shaped sections each provided with an interior shoulder, said casing surrounding said field magnet member, and means including a spacing block for securing said sections together, said means positioning said magnet member within said casing and causing the same to be clamped against the shoulder in one of said sections by said spacing block, and securing the other of said sections thereto, with the adjacent edges of said sections in abutting relation and a yoke member bridging the meeting edges of said sections and connected to both thereof, said yoke member adapted to pivotally engage a motor base member.

8. In an electric motor, a field magnet core having a plurality of poles inter-connected by arcuate sections, each of said arcuate sections being provided with a groove in the periphery thereof, a sheet metal casing surrounding said field magnet core comprising two substantially similar sections each having an interior shoulder, a bearing member in each of said sections, an armature rotatably mounted in said bearing members, means comprising a pair of bolts for connecting said casing sections together with their adjacent edges in abutting relation, said bolts passing through the grooves in said arcuate sections to support said field core and to clamp the same between said casing sections when said casing sections are connected thereby.

9. A motor case provided with an opening at one end and a bearing boss having a reduced end providing a shoulder thereon, said reduced end being inserted into said opening and interengaged with the metal of the casing to hold the parts together.

10. A motor case provided with an opening at one end and a bearing boss having a reduced end providing a shoulder thereon, said reduced end being inserted into said opening and turned over to clamp the casing against said shoulder.

11. A motor casing provided with an opening, and a brush holder inserted into said opening, one end of said brush holder being in exposed position for the insertion of a brush from without the casing, and a clip within the casing to secure the brush-holder in position, said clip having its ends projecting through the casing and there clenched.

12. A motor casing provided with a transverse opening near one end, a brush holder inserted into said opening and a clip to secure said brush holder to the casing, said clip having tabs projecting through the casing and clenched on the side thereof opposite the clip body.

13. In an electric motor, the combination of a field magnet member with a sheet metal casing comprising two similar cup-shaped sections for enclosing said magnet member, one of said sections being provided with an interiorly formed shoulder, means to space the other of said sections from said magnet member, and means passing through said shouldered section and said magnet member and engaging said spacing means to clamp said magnet member against said shoulder.

14. A sheet metal motor casing consisting of two substantially identical cup-shaped halves, having an opening at the closed end of each bearing bosses provided with aligned openings, each having an inwardly directed reduced portion adapted to enter the said casing openings and have the end of each spun over the edge of the casing opening for connection therewith.

15. A sheet metal motor casing consisting of two substantially identical cup-shaped sections, each having an interiorly formed shoulder, securing members passing through said sections to hold them together, a field core member positioned by said securing members and spacing members to hold said core member spaced from one of said shoulders and clamped against the other of said shoulders.

16. A motor casing provided with an opening, a brush holding tube positioned in said opening, one end of the same being in exposed position and a removable cap fitting over the exposed end of the tube, said tube being provided with a longitudinal groove and a transverse annular groove and a projection upon the interior of the cap to enter said grooves.

17. In an electric motor, the combination of a field magnet member with a sheet metal casing comprising two similar cup-shaped sections for enclosing said magnet member, one of said sections being provided with an interiorly formed shoulder, means to space the other of said sections from said magnet member, means passing through said shouldered section and said magnet member, and engaging said spacing means to clamp said magnet member against said shoulder, and means passing through the other of said sections to connect the same to said spacing means and to the shouldered section.

18. In an electric motor, the combination of a field magnet member with a sheet metal casing comprising two similar cup-shaped sections for enclosing said magnet member, both of said sections being provided with an interiorly formed shoulder, means secured to one of said sections against the shoulder thereof to space said section from said magnet member, means passing through the other of said sections and said magnet member to engage said spacing means to clamp said magnet member between the same and the shoulder upon the second mentioned casing section and to connect said sections together.

19. In an electric motor, the combination of a field magnet member with a sheet metal casing comprising two similar cup-shaped sections for enclosing said magnet member, both of said sections being provided with an interiorly formed shoulder, means located between said magnet member and the shoulder of one of said casing sections to space said section from said magnet member, and means passing through said sections, said magnet member and into said spacing means for clamping said magnet member between said spacing means and the shoulder upon the other of said casing sections.

In witness whereof, I have hereunto set my hand this 23 day of April, 1921.

ALFRED C. GILBERT.